United States Patent
Brauch et al.

(10) Patent No.: US 11,951,419 B2
(45) Date of Patent: Apr. 9, 2024

(54) PLATE SETTLER COVER AND METHOD

(71) Applicant: MEURER RESEARCH, INC., Golden, CO (US)

(72) Inventors: Joseph K. Brauch, Aurora, CO (US); Christopher D. Hanson, Arvada, CO (US)

(73) Assignee: MEURER RESEARCH, INC., Golden, CO (US)

( * ) Notice: Subject to any disclaimer, the term of this patent is extended or adjusted under 35 U.S.C. 154(b) by 0 days.

(21) Appl. No.: 17/841,923

(22) Filed: Jun. 16, 2022

(65) Prior Publication Data

US 2022/0305408 A1 Sep. 29, 2022

Related U.S. Application Data

(63) Continuation of application No. 16/871,423, filed on May 11, 2020, now Pat. No. 11,364,455, which is a continuation of application No. 15/993,740, filed on May 31, 2018, now Pat. No. 10,646,798, which is a continuation of application No. 15/254,725, filed on Sep. 1, 2016, now Pat. No. 9,993,747.

(60) Provisional application No. 62/328,761, filed on Apr. 28, 2016, provisional application No. 62/213,001, filed on Sep. 1, 2015.

(51) Int. Cl.
*B01D 21/00* (2006.01)
*E04H 4/08* (2006.01)

(52) U.S. Cl.
CPC ..... *B01D 21/0006* (2013.01); *B01D 21/0045* (2013.01); *B01D 21/0096* (2013.01); *B01D 21/0003* (2013.01); *E04H 4/08* (2013.01)

(58) Field of Classification Search
CPC ............ B01D 21/0006; B01D 21/0045; B01D 21/0096; B01D 21/0003; E04H 4/08
See application file for complete search history.

(56) References Cited

U.S. PATENT DOCUMENTS

| | | |
|---|---|---|
| 1,738,829 A | 12/1929 | Jones |
| 3,488,420 A | 1/1970 | Keast et al. |
| 3,903,552 A | 9/1975 | Erlandsson et al. |
| 4,028,249 A | 6/1977 | McGivern |
| 4,448,689 A | 5/1984 | von Nordenskjold |
| 4,767,536 A | 8/1988 | Roley |

(Continued)

FOREIGN PATENT DOCUMENTS

| | | |
|---|---|---|
| CN | 103372336 | 10/2013 |
| EP | 0191486 | 8/1986 |

(Continued)

OTHER PUBLICATIONS

"Zickert, Z6000 Cover," Nordic Water Products AB, 2012, 2 pages.

(Continued)

*Primary Examiner* — Liam Royce
(74) *Attorney, Agent, or Firm* — Sheridan Ross P.C.

(57) ABSTRACT

The present invention is directed to a plate settler cover that prevents algae growth, prevents contamination from organic material, and provides structural support for a user who is standing or walking on the plate settler system. The plate settler covers can either float directly on standing water present in the system or may be structurally supported such that the plate cover is positioned above the surface of the water.

20 Claims, 9 Drawing Sheets

(56) References Cited

U.S. PATENT DOCUMENTS

| | | |
|---|---|---|
| 4,830,748 A | 5/1989 | Hall |
| 5,049,278 A | 9/1991 | Galper |
| 5,074,427 A | 12/1991 | Siemerink et al. |
| 5,208,461 A | 5/1993 | Tipton |
| 5,397,472 A | 3/1995 | Bouchard |
| 5,837,133 A | 11/1998 | Natale |
| 5,922,745 A | 7/1999 | McCarthy et al. |
| 6,216,881 B1 | 4/2001 | Schaller |
| 6,324,792 B1 | 12/2001 | DeGarie |
| 6,612,079 B2 | 9/2003 | DeGarie et al. |
| 6,923,872 B2 * | 8/2005 | Hyosong ............... B01D 21/34 134/182 |
| 6,971,398 B1 | 12/2005 | Brauch et al. |
| 7,314,572 B1 | 1/2008 | Meurer |
| 7,850,860 B2 | 12/2010 | Dissinger et al. |
| 8,317,036 B2 | 11/2012 | Roberts |
| 8,454,841 B2 | 6/2013 | Roberts |
| 8,585,896 B2 | 11/2013 | Roberts et al. |
| 8,652,328 B2 | 2/2014 | Roberts |
| 8,889,015 B2 | 11/2014 | Roberts et al. |
| 9,327,999 B1 | 5/2016 | Philbrook |
| 9,993,747 B2 | 6/2018 | Brauch et al. |
| 10,646,798 B2 | 5/2020 | Brauch et al. |
| 11,364,455 B2 | 6/2022 | Brauch et al. |
| 2008/0120771 A1 | 5/2008 | Rayner |
| 2009/0265846 A1 | 10/2009 | Stuart et al. |
| 2010/0243585 A1 | 9/2010 | Dissinger et al. |
| 2011/0113546 A1 | 5/2011 | Iosim |
| 2013/0277301 A1 | 10/2013 | Schaller |
| 2014/0131262 A1 | 5/2014 | Roberts |
| 2014/0157508 A1 | 6/2014 | LaMont |
| 2014/0366260 A1 | 12/2014 | Balschick |
| 2015/0068988 A1 | 3/2015 | Roberts |
| 2015/0068989 A1 | 3/2015 | Roberts et al. |
| 2015/0152661 A1 | 6/2015 | Scullin |
| 2016/0101932 A1 | 4/2016 | Stabler et al. |
| 2017/0056790 A1 | 3/2017 | Brauch et al. |

FOREIGN PATENT DOCUMENTS

| | | |
|---|---|---|
| WO | WO 2010/055269 | 5/2010 |
| WO | WO 2014/193870 | 12/2014 |
| WO | WO 2021/226058 | 11/2021 |

OTHER PUBLICATIONS

Official Action for U.S. Appl. No. 15/254,725, dated Nov. 18, 2016, 7 pages, Restriction Requirement.

Official Action for U.S. Appl. No. 15/254,725, dated Apr. 7, 2017, 14 pages.

Notice of Allowance for U.S. Appl. No. 15/254,725, dated May 24, 2017, 9 pages.

Official Action for U.S. Appl. No. 15/254,725, dated Sep. 11, 2017, 12 pages.

Official Action for U.S. Appl. No. 15/254,725, dated Mar. 15, 2018, 11 pages.

Notice of Allowance for U.S. Appl. No. 15/254,725, dated Apr. 5, 2018, 8 pages.

Official Action for U.S. Appl. No. 15/993,740, dated Sep. 25, 2019, 9 pages.

Notice of Allowance for U.S. Appl. No. 15/993,740, dated Jan. 7, 2020, 5 pages.

Official Action for U.S. Appl. No. 16/871,423, dated Oct. 20, 2021 12 pages.

Notice of Allowance for U.S. Appl. No. 16/871,423, dated Feb. 9, 2022 5 pages.

Written Opinion for International (PCT) Patent Application No. PCT/US21/30619, dated Aug. 12, 2021, 5 pages.

* cited by examiner

PLATE SETTLER COVER AND METHOD

CROSS-REFERENCE TO RELATED APPLICATIONS

This application is a continuation of U.S. patent application Ser. No. 16/871,423, filed May 11, 2020 (now U.S. Pat. No. 11,364,455, issued Jun. 21, 2022), which is a continuation of U.S. patent application Ser. No. 15/993,740, filed May 31, 2018 (now U.S. Pat. No. 10,646,798, issued May 12, 2020), which is a continuation of U.S. patent application Ser. No. 15/254,725, filed Sep. 1, 2016 (now U.S. Pat. No. 9,993,747, issued Jun. 12, 2018), which claims priority from U.S. Provisional Patent Application Ser. No. 62/328,761, filed Apr. 28, 2016, and U.S. Provisional Patent Application Ser. No. 62/213,001, filed Sep. 1, 2015. The entire disclosures of the prior applications are considered to be part of the disclosure of the accompanying application and are hereby incorporated by reference.

FIELD OF THE INVENTION

This invention relates to the field of plate settler equipment and technology.

DESCRIPTION OF THE RELATED ART

Plate settlers are utilized in water treatment facilities as a means for separating solids from an influent flow of liquid. Influent flows through a basin and rises between the inclined plate settlers. As flow travels up the plates, solids settle out onto the plate surface. The clarified water is evenly extracted through the flow control deck, and is distributed into troughs where it flows out of the basin. Sludge then slides into a quiet zone beneath the plate settlers. Representative examples of plate settlers can be found in U.S. Pat. Nos. 5,049,278, 7,850,860, and 8,585,896.

While plate settling technology is widely used in water treatment facilities, a number of problems arise from their use. For example, plate settlers typically have at least an inch or more of water above the top of the plate settlers. When exposed to sunlight, this often leads to algae growth. Furthermore, because the plate settlers are completely submerged by water yet remain exposed to the air, winter months can lead to freezing of the water which prevents water treatment and could damage the plate settlers. Similarly, because the plate settlers are open to the environment, waterfowl can rest on the water's surface, leading to the presence of coliform bacteria in the water from the bird's feces which results in the need of additional disinfection to ensure public safety. Furthermore, organic matter such as leaves and debris are prone to falling into the basin resulting in elevated TOC (Total Organic Carbon), affecting the taste and odor and treatability of the water.

Thus, there is a need for an apparatus which prevents contamination of the fluid in the basin, prevents algae growth, and preferably provides structural support for a user to stand or walk on.

BRIEF SUMMARY OF THE INVENTION

Consistent with the above-mentioned needs, the present invention provides a cover for plate settlers for preventing or vastly reducing algae growth as well as contamination and freezing of the water on the surface of plate settler assemblies. Additionally, various embodiments of the present invention also provide a solid surface for users to stand or walk on, on top of the plate settler assemblies.

It is an object of various embodiments of the present invention to provide a plate settler cover which will block sunlight from the water surface. In one aspect of various embodiments of the present invention, a cover is provided which prevents sun floc from forming, thereby improving settling which in turn improves the filter runs. It is another aspect of various embodiments of the present invention to provide a cover which is insulated and prevents freezing of the water by eliminating the surface to air interface of below freezing temperatures. It is yet another aspect of various embodiments of the present invention to provide a cover which is able to protect the water from contaminants, including trash which could damage the pumps, waterfowl and bird feces which may add coliform bacteria to the water, and organic matter, including leaves, which can affect the taste and odor and treatability of the water.

It is another object of various embodiments of the present invention to provide a plate settler cover which can be utilized with other existing plate settler system, including but not limited to those described in U.S. Pat. Nos. 5,049,278, 7,850,860, and 7,850,860, and 8,585,896, all herein incorporated by reference.

Another object of various embodiments of the present invention is to reduce operating costs related to plate settlers and water treatment by providing a plate settler cover. The use of a plate settler cover reduces the rate of dissipation of chlorine in pre-chlorinated water tanks, thereby saving money and eliminating the need for additional chlorine to maintain proper disinfection. The plate settler cover further reduces the evaporation of water which has been treated with expensive chemicals, thereby eliminating chemical waste. Furthermore, the plate settler covers further reduce or eliminate maintenance and cleaning costs associated with cleaning the tops of the plates, which typically must take place weekly.

It is another object of various embodiments of the present invention to provide a surface overlying a plate settler assembly for maintenance workers and engineers to walk on to improve stability and safety and also to increase their efficiency on the job. In one aspect of various embodiments of the present invention, the plate settler covers provide a walking surface preferably which allows a maintenance worker to safely and quickly traverse the plate settlers. In another aspect of various embodiments of the present invention, the plate settler covers improve the safety of walking on the top surface of the plate settlers without the covers because the growth of algae and accumulation of slippery solids typically found in submerged conditions is stopped or reduced. Accordingly, workers can safely walk on the plate settlers without fear of falling or sliding due to algae and accumulation of slippery solids typically found in submerged conditions. In other embodiments, covers are manufactured to include ribs, divots, mounds or other structural features to increase the stability of a standing user, to elevate the covers from the top surface of underlying water, to increase the buoyancy, rigidity, and conformability of the plate settlers, and to make the plate covers easier for replacement and retrofitting. In another embodiment, the stability may be increased through the use of a friction increasing laminate, coating, film or any other friction increasing substance.

It is yet another object of various embodiments of the present invention to provide a floating plate settler cover. In one embodiment, this is achieved through the use of cell foam (preferably closed-cell foam) attached to the underside of the plate settler cover. In another embodiment, the floating is achieved through the use of cell foam within the plate cover. In yet another embodiment, the floating is achieved by manufacturing the plate cover from a material which floats on water, such as air-entrapped plastic structures, inflatable structures, etc.

It is yet another object of various embodiments of the present invention to provide a plate settler cover that is selectively and securely interconnected to the plate settlers. In a preferred embodiment, the plate cover is manufactured with a locking means such that one or more of the plate settler covers are able to be inserted and/or otherwise secured to the plate settler, e.g., around its rim, edge, internal plates, etc. In other embodiments, the plate cover is manufactured with support legs that connect to the individual plates and provide structural support for the cover above the plate settler assemblies. In other embodiments, the plate covers may include latch connections, VELCRO® (a hook and loop device) connections, etc., which allow for the plate covers to be selectively interconnected and secured to the plate settler assemblies.

It is yet another object of various embodiments of the present invention to provide a plate settler cover which is adapted to interconnect with any existing plate settler systems. In preferred embodiments, this is accomplished by manufacturing the plates in different sizes and/or by having covers manufactured such that the various geometries, such as the widths, lengths, and depths are adjustable to coincide with a particular plate settler system.

It is yet another object of various embodiments of the present invention to provide a plate settler cover with a surface resistant to rust, algae growth, and other damage. In one embodiment, this may be accomplished by manufacturing the plate cover from a material resistant to algae growth or rust formation. In another embodiment, this may be accomplished through the use of a resistant laminate placed on the surfaces of the plate cover. In yet another embodiment, this may be accomplished through the use of a resistant coating applied to the surfaces of the plate cover.

It is yet another object of various embodiments of the present invention to provide a retractable plate settler cover. In one embodiment, this may be accomplished by placing a plurality of segmented plates on a track connected to a motor such that the plates may be removed or placed automatically. In another embodiment, this may be accomplished through the use of plates made from a pliable material which may be attached to a roller and stored in a rolled up position and which may be unrolled to cover the plate settlers; in such embodiments, the plates may optionally be weighted along one or more preselected sides such that the cover is not affected by wind when unrolled. In another embodiment, this may be accomplished by including a handle on an exterior surface of a plate settler cover made from a lightweight, pliable material, whereby an operator may grip the handle to manually pull back the plate settler cover.

It is yet another object of various embodiments of the present invention to provide a plate settler cover comprising multiple layers and/or multiple materials. By way of non-limiting example, plate settler covers according to the present invention may comprise one or more metal supports interspersed by a lightweight fabric material, such that the plate settler cover is relatively lightweight but permits a user to walk thereon; such embodiments may permit for the selective replacement of portions of the fabric material over time due to, for example, weather damage.

Similarly, while coverings of various sorts are known in the pool art, such covers are intended to accomplish disparate tasks, such as increasing safety by preventing children from falling into and drowning in pools; to prevent leaves and other debris from falling into the pool, and to prevent heat loss from pools. The covers employed in the various embodiments of the present invention, however, are intended to prevent the undesired growth of algae upon the top surfaces of settling tanks, clarifiers, etc. In a preferred embodiment, plate settler assemblies are covered such that the top most surface is substantially covered in a fashion that does not permit a significant amount of sunlight to shine upon the top surface of the water in such assemblies, thus precluding the conditions for algae growth on such water surface and the underlying top-most portion of the settler units.

While various different designs of covers may be employed, some preferred embodiments have at least one, and preferably at least two of the following characteristics: a cover being retractable or removable by a single person, whether via a motor operated system that withdraws and redeploys a cover; a cover that facilitates a person walking across the cover while the cover is on top of the settler plate assemblies, with certain embodiments also including predetermined sections of the cover that are transparent enough to permit one walking on top of the cover to peer down into the plate settler assemblies, such transparent panel portions being suitably coated or manufactured so as to be tinted to discourage algae growth due to light being transmitted there through; and a cover that precludes the accumulation of water on top of the cover that may otherwise accumulate if rain or snow is present, with certain embodiments including an electric and/or solar-powered heating element for melting accumulated snow and ice.

With respect to one particular aspect of certain preferred embodiments, and one which distinguishes the present inventive embodiments from various prior art pool cover art, is directed to a cover that permits liquid to flow through the cover so that accumulation of water on top of the cover is not a problem (as recognized, e.g. in prior art systems, see, US Patent Publication No. 2014/0157508 to LaMont, incorporated herein by this reference). In other embodiments, when panels are employed to cover settler assemblies, the end portions of the panels are such that they permit liquid to flow through, thus precluding the need for any type of separate pump to remove accumulated water from the surfaces of such covering material. In other embodiments the material comprising the cover is such that it relatively freely permits water to flow or descend downwardly into the settling assembly below such cover. For example, a mesh fabric-like material may be employed for this purpose, whether on a roll (such that it can be reversibly retracted and deployed over the surface of the settler plate assembles) or used on the surface of panels designed to be placed in abutting fashion to cover substantial areas, preferably the entire area, of the settler plate assemblies (but preferably not the troughs in-between). As otherwise described herein, the material of the panels or a rolling cover can comprise various materials that are weather resistant (such as, by way of non-limiting example, a heavier material disposed along one or more edges to prevent the cover from being affected by wind), permit a person to walk on top thereof (so that even if a person's weight causes the cover to contact the underlying settler assembles, and in the process forces water out of the way), the cover permits water to pass there through, but is constructed of materials that does not facilitate the growth of algae on the surface of the water above the settler assemblies.

Also distinguishing various embodiments of the present invention from pool covers in the prior art is the absence of side contacting elements typically found on pool covering systems. For example, certain embodiments of the present invention do not employ tracks on each side of a pool cover that confine the cover in a straight line when it is deployed or retracted. Instead, in various embodiments, the covers used to cover settling tank assemblies do not have a track that connects the cover to a side wall in a fashion similar to a pool cover. With respect to alternative structures that can be adapted for use with the present invention, US Patent Publication No. 2011/0113546 to Iosim, 2015/0152661 to Scullin, 2008/0120771 to Rayner, and 2014/0366260 to Balschick, are incorporated herein by this reference.

The inventive method embodied by various embodiments of the present invention includes the following steps:
i) Providing at least three predetermined dimensioned covers for a plate settler that are configured to be positioned end-to-end over the top-most portion of a plate settler;
ii) Placing the at least three covers on the top of a plate settler such that the bottom-most portion of the cover, preferably around the periphery of each cover, is closest to the underlying plate settler structure, with the cover having at least two side edges that descend downward toward the plate settler assembly and either rest thereon or float above such assembly;
iii) Moving individual covers together such that at least one of their respective sides abuts another side of an adjacent cover, wherein the collection of covers acts to substantially encompass the surface of the plate settler assembly, thus reducing the incidence of sunlight upon the top surface of water overlying the plate settler;
iv) Maintaining the at least three covers in place over the top of a plate settler such that sunlight that would otherwise fall upon the water on the top surface of the plate settler, instead contacts the exterior surface of the three covers, wherein the reduction of sunlight impacting the surface of water above the plate settler reduces the growth of algae that would otherwise accumulate on the surface of the plate settler.

In preferred embodiments, the covers are adapted to withstand the weight of a human of at least about 120 pounds walking on top thereof without denting or damaging the covers. Further steps of the method in other embodiments include:
i) Walking on the surface of one of the covers and removing another adjacent cover for routine maintenance of the plate settler assembly.
   Still other embodiments include the step of providing the covers over the plate settler assembly when the ambient temperature is below freezing, so as to preclude freezing of the surface of water overlying the plate settler assembly.
   In still other embodiments, instead of having distinct panels employed and sized to effectively cover the top-most region of a plate settler assembly, a reversibly rollable cover is provided over the top portion of a plate settler assembly, with such cover configured to effectively reduce the amount of sunlight that impinges upon the surface of water overlying the plate settlers, and thereby reduces the amount of algae accumulation that would otherwise occur without the cover. Preferably the retractable cover does not employ any side-tracks (which conventional pool covers employ), but use of tracks or other guidance mechanisms can be employed to properly guide the conveyance of the plate settler cover over the tip portion of the assembly.
ii) Such a rolling, retractable cover is constructed of material that preferably permits water to flow through, such a mesh fabric material, and thus, problems experienced by traditional pool covers involving the need to evacuate water that builds up on the surface of such covers is avoided. Indeed, when plate covers are employed, the edges of the plates have sufficient room between the covers so that rain or snow can readily fall down into the plate settler assembly. In various embodiments, the covers can be retrofitted to achieve certain desired characteristics, such as addition of buoyancy members (closed cell foam, inflatable or inflated buoys', etc. to achieve floating covers; the provision of adjustable depending members such that contact with underlying plate settlers can be achieved at predetermined heights above the water level above the plate settlers, etc. The material comprising the covers, as well as the color thereof, can be selected for various purposes, such as having them colored black to absorb more heat and thus warm the underlying water; or constructed of a bubble wrap-like material so as to conserve the temperature of the water and/or to increase the temperature thereof so as to avoid ice or snow buildup, etc.

In yet another embodiment of the present invention, the plate settler covers may be semicylindrical. Further, these semicylindrical covers may be retractable.

In yet another embodiment of the present invention, the plate settler covers may be capable of rolling up for storage.

One of skill in the art will appreciate the various structures and associated methods rendered possible via the guidance provided herein as to how to build, maintain and construct various embodiments of the present invention to achieve desired functionality, such as the reduction of algae growth in conventionally open topped settler plate assemblies; the reduction of ice/snow build up on the top surface of plate settler assemblies, and the ability to construct plate settlers such that individuals and machinery can be more easily and readily moved across the surface of plate settlers for maintenance or inspection purposes.

For purposes of further disclosure and to comply with applicable written description and enablement requirements, the following references generally discuss systems and methods related to plate settlers, and are hereby incorporated by reference in their entireties:

U.S. Pat. No. 7,314,572, entitled "Methods of and apparatus for low-angle-tray settling with multi-zone configuration," issued 1 Jan. 2008 to Meurer ("Meurer").

U.S. Pat. No. 7,850,860, entitled "Plate settler with angular support members," issued 14 Dece. 2010 to Dissinger et al. ("Dissinger").

U.S. Pat. No. 8,317,036, entitled "Apparatus and method for removing impurities from water or wastewater," issued 27 Nov. 2012 to Roberts ("Roberts I").

U.S. Pat. No. 8,454,841, entitled "Method of filtering water or wastewater," issued 4 Jun. 2013 to Roberts ("Roberts II").

Chinese Patent Application Publication 103372336, entitled "Two-stage water inlet weir plate," published 30 Oct. 2013 to Ju ("Ju").

U.S. Pat. No. 8,652,328, entitled "Apparatus for filtering water or wastewater," issued 18 Feb. 2014 to Roberts ("Roberts III").

U.S. Patent Application Publication 2014/0131262, entitled "Apparatus and method for removing impurities from water or wastewater," published 15 May 2014 to Roberts ("Roberts IV").

U.S. Pat. No. 8,889,015, entitled "Method of installing an air scour system into a filter bed," issued 18 Nov. 2014 to Roberts et al. ("Roberts V").

U.S. Patent Application Publication 2015/0068988, entitled "Apparatus for removing impurities from water or wastewater and a method of installing a fluid distribution system therein," published 12 Mar. 2015 to Roberts ("Roberts VI").

U.S. Patent Application Publication 2015/0068989, entitled "Apparatus for removing impurities from water or wastewater and a method of installing a fluid distribution system therein," published 12 Mar. 2015 to Roberts et al. ("Roberts VII").

U.S. Pat. No. 9,327,999, entitled "Compact inclined plate sedimentation devices and methods," issued 3 May 2016 to Philbrook ("Philbrook").

Further description of advantages, benefits, and patentable aspects of the present disclosure will become evident from the accompanying drawings and description herein below. All novel aspects of the disclosure, whether mentioned explicitly in this Summary section or not, are considered subject matter for patent protection either singly or in combination with other aspects of this disclosure. Accordingly, such novel aspects disclosed herein below and/or in the drawings that may be omitted from, or less than fully described in, this Summary section are fully incorporated herein by reference into this Summary. In particular, all (any) claims of the Claims section herein below are fully incorporated herein by reference into this Summary section.

DETAILED DESCRIPTION OF THE INVENTION

Figure 1:
FIG. 1 is an embodiment of a plate settler system of the prior art.

FIG. 1 shows a plate settler system 1 of the prior art without a cover. As shown, without a cover, the plate settler system 1 is open to the environment. As a result, algae grow on the surface of the plate settlers 3, leading to a slippery, thin film of algae on the surface of the plate settlers 3, causing myriad problems for water treatment facilities. For example, maintenance workers, who often need to walk on the plate settlers 3, are exposed to unsafe walking surfaces which increase the risk of injury. As a result, cleaners often must be hired to remove the algae, leading to additional costs. Due to the rate of growth of algae, it is often the case that by the time all of the algae are successfully removed, more algae has already begun to grow. Thus, cleaners are needed on at least a weekly basis, if not more often.

Figure 2:
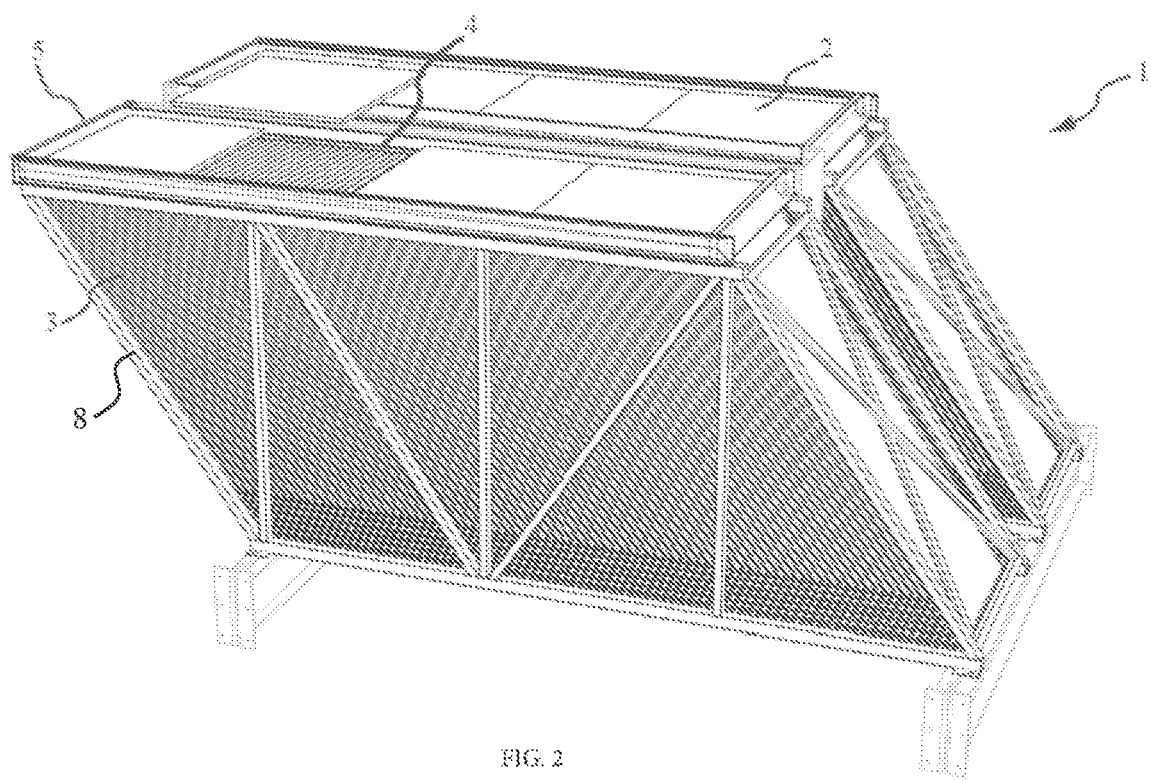
FIG. 2 is an elevated perspective view of one embodiment of the present invention showing how individual plate covers are positioned on the top of a plate settler.

FIG. 2 shows a plate settler system 1 utilizing the plate settler covers 2 of the present invention. In one embodiment, the plate settler covers 2 are segmented such that four covers 2 are utilized for each plate settler 3, each plate settler 3 being positioned within a frame 8. However, one having skill in the art will recognize that the plate covers 2 could be a variety of sizes such that each plate settler 3 utilizes one, two, three, five, six, or any number of covers 2 based on the needs of the user and the design of the plate settler system 1 being utilized.

In a preferred embodiment, the plate settler covers 2 are made of T-304 stainless steel, 22 gauge with closed cell foam adhered to the underside. However, one having skill in the art will recognize the covers 2 may be made of any number of materials including, but not limited to, metal, aluminum, polymer, plastic, wood, glass, carbon fiber, and cement. In addition, the upper surface of the plate cover 2 may be smooth or may be designed to improve friction between the plate cover 2 and the user walking on the plate cover 2. For example, the plate cover 2 may include ribbing, divots, mounds, or other structures designed to improve the friction. Alternatively, the plate cover 2 may include a friction increasing laminate, coating, or paint which prevents slipping. Additionally, one skilled in the art will further recognize that the plate cover 2 may be provided without cell foam, or that the cell foam may be adhered to the cover 2 in a variety of ways, including being placed inside the plate. Lastly, while cell foam is utilized in a preferred embodiment, one having skill in the art will recognize that any suitable floatation material may be utilized including, but not limited to, the use of air bags or making the plate cover 2 itself from a floating material.

As further shown in FIG. 2, each plate cover 2 selectively interconnects with the system 1, such that the cover 2 rests in a cavity 4 between the top of the plate settlers 3 and an upper rim 5 associated with the frame 8. In a preferred embodiment, the covers 2 interconnect to the system 1 by resting in the cavity 4 such that the edges of the plate 2 are flush against the upper rim 5 and the bottom of the plate 2 is in contact with the plate settler 3. Further, in this preferred embodiment, the plate cover 2 floats on the surface of the water above the plate settlers 3. However, one skilled in the arts will recognize that a variety of interconnecting means can be utilized including snapping into place, sliding into a track, locking by a locking mechanism, and any other conventional or unconventional means of securing the plate covers 2. Once in place, the plate covers 2 cover the entirety of the plate settlers 3.

Figure 3:
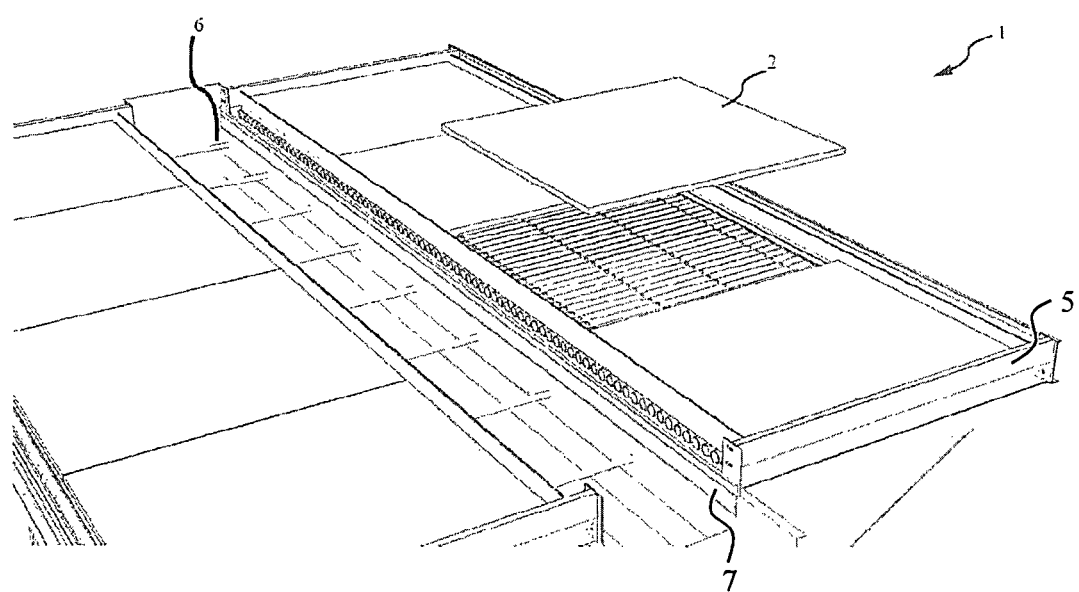
FIG. 3 is an elevated perspective view of one embodiment of the present invention showing plate covers resting flush against an upper rib of a plate settler.

FIG. 3 shows another embodiment of the present invention. As shown, the plate settler system 1 further has a trough 6, which allows the treated water to flow out of the basin. As influent flows through the basin and rises between the plate settlers 3, solids settle out onto the plate settler 3 surfaces. The clarified water is then evenly extracted through a flow control deck 7, and is distributed into the troughs 6 where it flows out of the basin.

Figure 4:
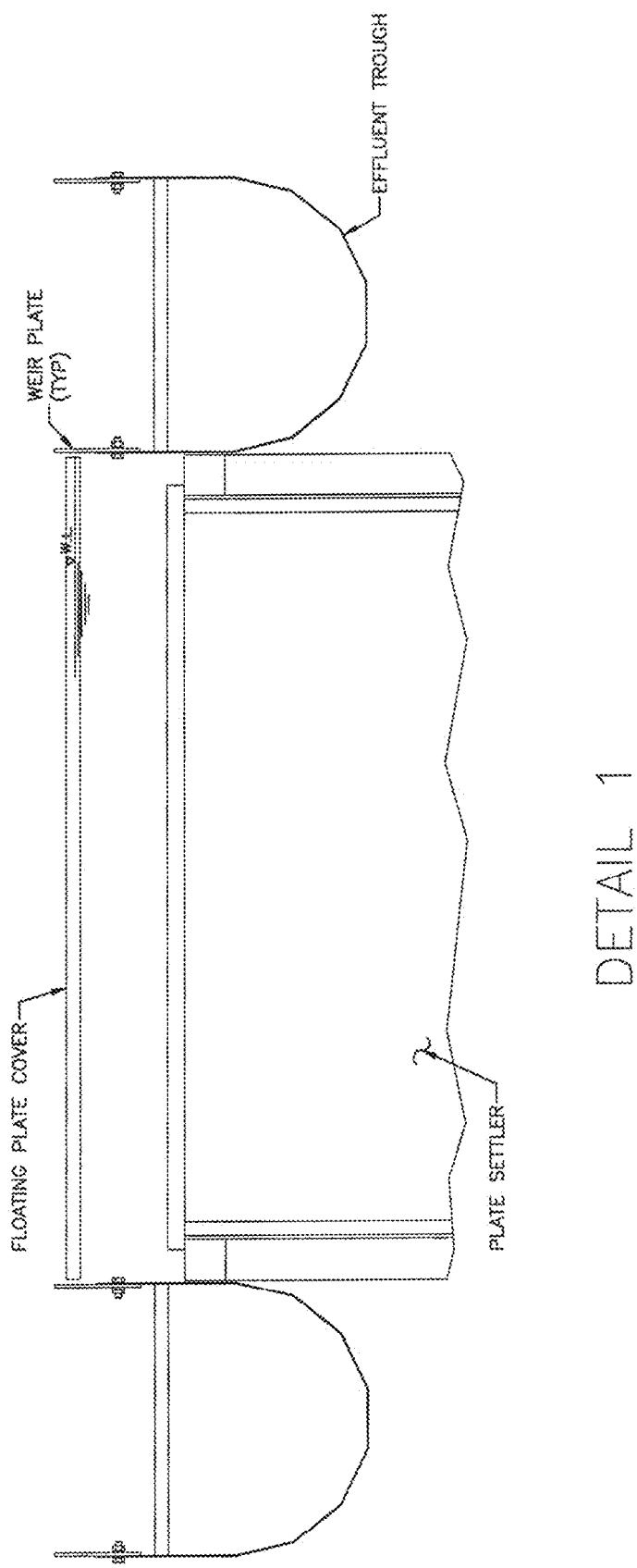
FIG. 4 is a cross-sectional side view of one embodiment of the present invention showing a floating plate cover.
Figure 5:
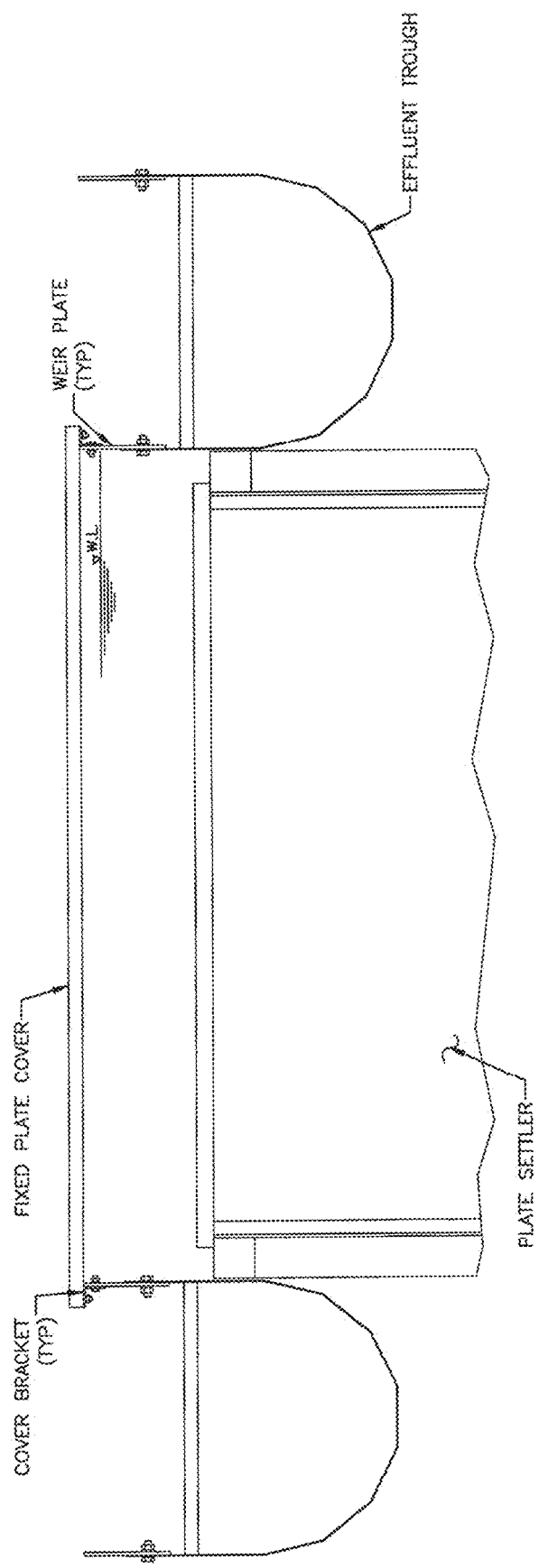
FIG. 5 is a cross-sectional side view of one embodiment of the present invention showing a fixed plate cover.
Figure 6:
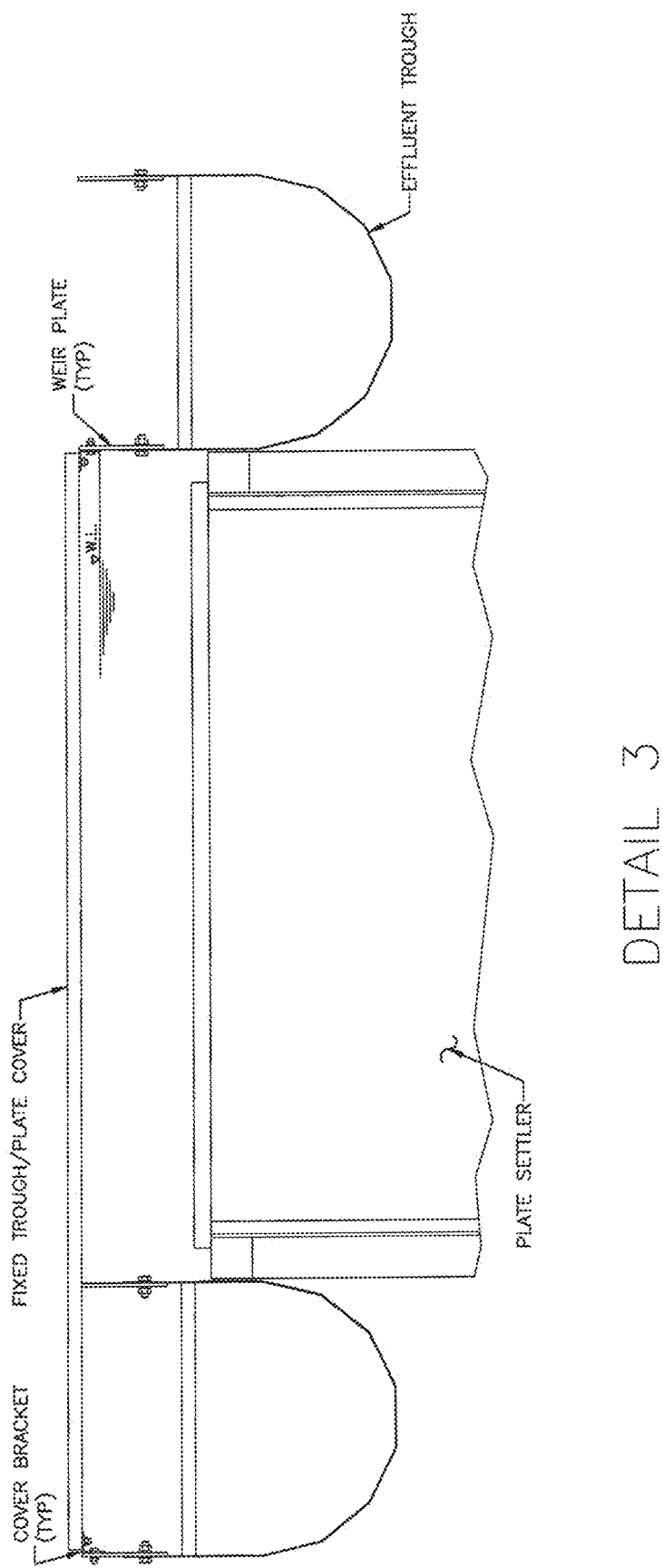
FIG. 6 is a cross-sectional side view of one embodiment of the present invention showing a fixed trough cover and fixed plate cover.

FIGS. 4-6 show various embodiments of the present invention in which the trough 6 of the plate settler system 1 is elevated above the plate settlers 3. As shown in FIG. 4, plate covers 2 may be utilized which float on the surface of the water. In a preferred embodiment, the plate settler covers 2 are made of T-304 stainless steel, 22 gauge with closed cell foam adhered to the underside. However, one having skill in the art will recognize the covers 2 may be made of any number of materials including, but not limited to, metal, aluminum, polymer, plastic, wood, glass, carbon fiber, and cement. Additionally, one skilled in the art will further recognize that the plate cover 2 may be provided without cell foam, or that the cell foam may be adhered to the cover 2 in a variety of ways, including being placed inside the plate. Lastly, while cell foam is utilized in a preferred embodiment, one having skill in the art will recognize that any suitable floatation material may be utilized including, but not limited to, the use of air bags or making the plate cover 2 itself from a floating material.

Additionally, weir plates 7 are utilized which prevent the cover 2 from moving from side to side. While weir plates 7 are utilized in a preferred embodiment, one having skill in the art will recognize that any conventional or unconventional support structures may be utilized to minimize the side to side movement of the plate covers 2.

FIG. 5 shows another embodiment of the plate settler system 1 of FIG. 4. In this embodiment, the plate cover 2 is fixed, rather than being free to float. In a preferred embodiment, the plate settler covers 2 are made of T-304 stainless steel, 22 gauge. However, one having skill in the art will recognize the covers 2 may be made of any number of materials including, but not limited to, metal, aluminum, polymer, plastic, wood, glass, carbon fiber, and cement. The plates are fixed through the use of weir plates 7. The cover 2 sits on top of the weir plates 7, preventing the cover 2 from floating. While weir plates 7 are used in a preferred embodiment, one having skill in the art will recognize that any conventional or unconventional support structures may be utilized for supporting the plate cover 2.

FIG. 6 shows yet another embodiment of the plate settler system 1 of FIG. 4. As shown, the cover 2 of this embodiment covers both the plate settlers 3 and the trough 6. Further, the plate cover 2 of this embodiment is likewise fixed. The plates are fixed through the use of weir plates 7. The cover 2 sits on top of the weir plates 7, preventing the cover 2 from floating. While weir plates 7 are used in a preferred embodiment, one having skill in the art will recognize that any conventional or unconventional support structures may be utilized for supporting the plate cover 2.

Figure 7:
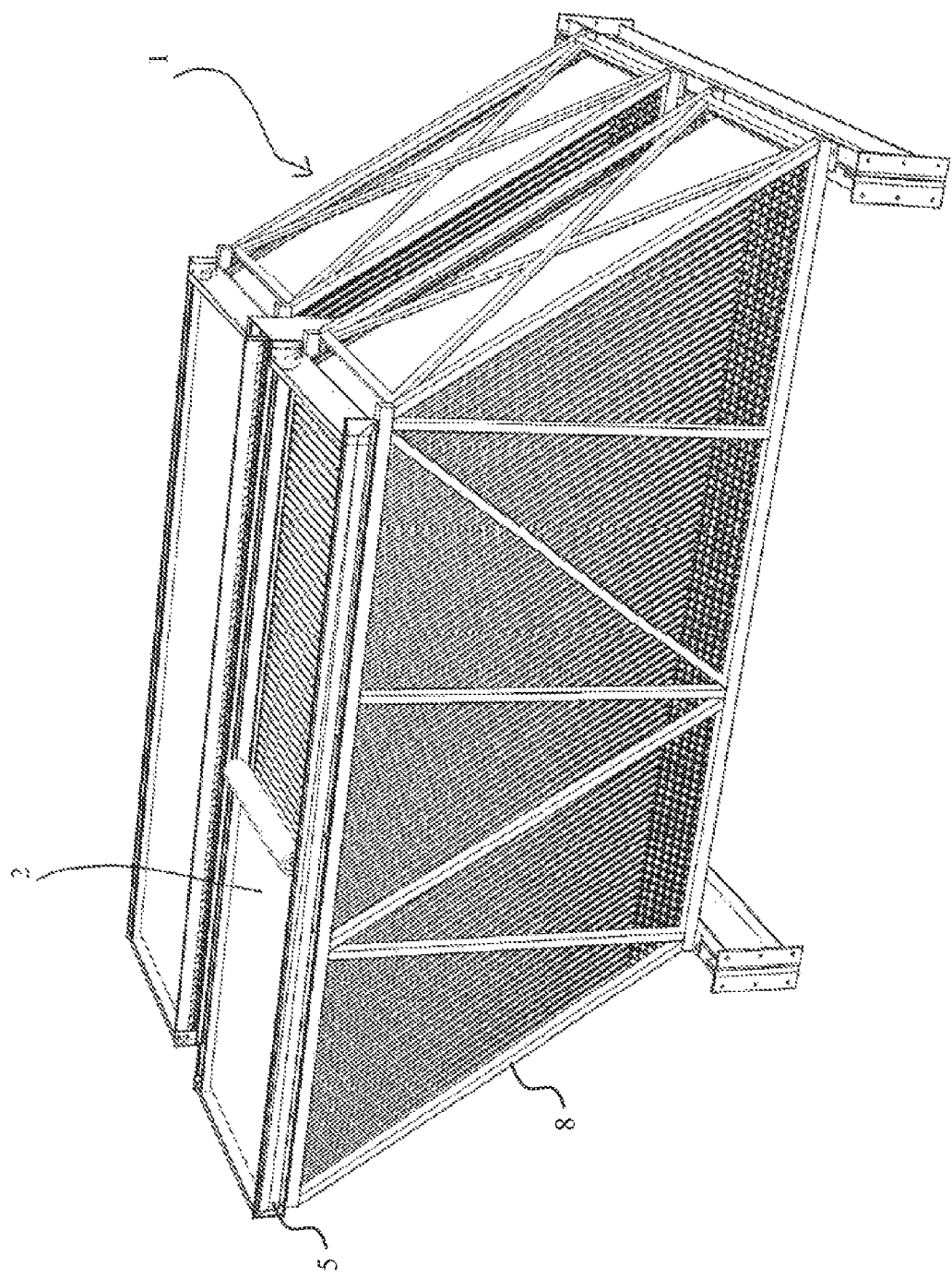
FIG. 7 is an elevated perspective view of one embodiment of the present invention showing a rollable plate cover.

FIG. 7 shows a plate settler system 1 utilizing another embodiment of the plate settler covers 2 of the present invention. As shown, the cover 2 may be configured to roll up, such that it can be stowed away at one end of the plate settler system 1. Accordingly, the plate cover 2 may be made of a material which is elastic or deformable, such as tarp, various polymers, vinyls, etc. Furthermore, the cover itself may be comprised of segments of rigid material such as metal, plastic, wood, various polymers, etc. These segments may then be interconnected via an elastic material which would allow the cover to roll up be stored.

Figure 8:
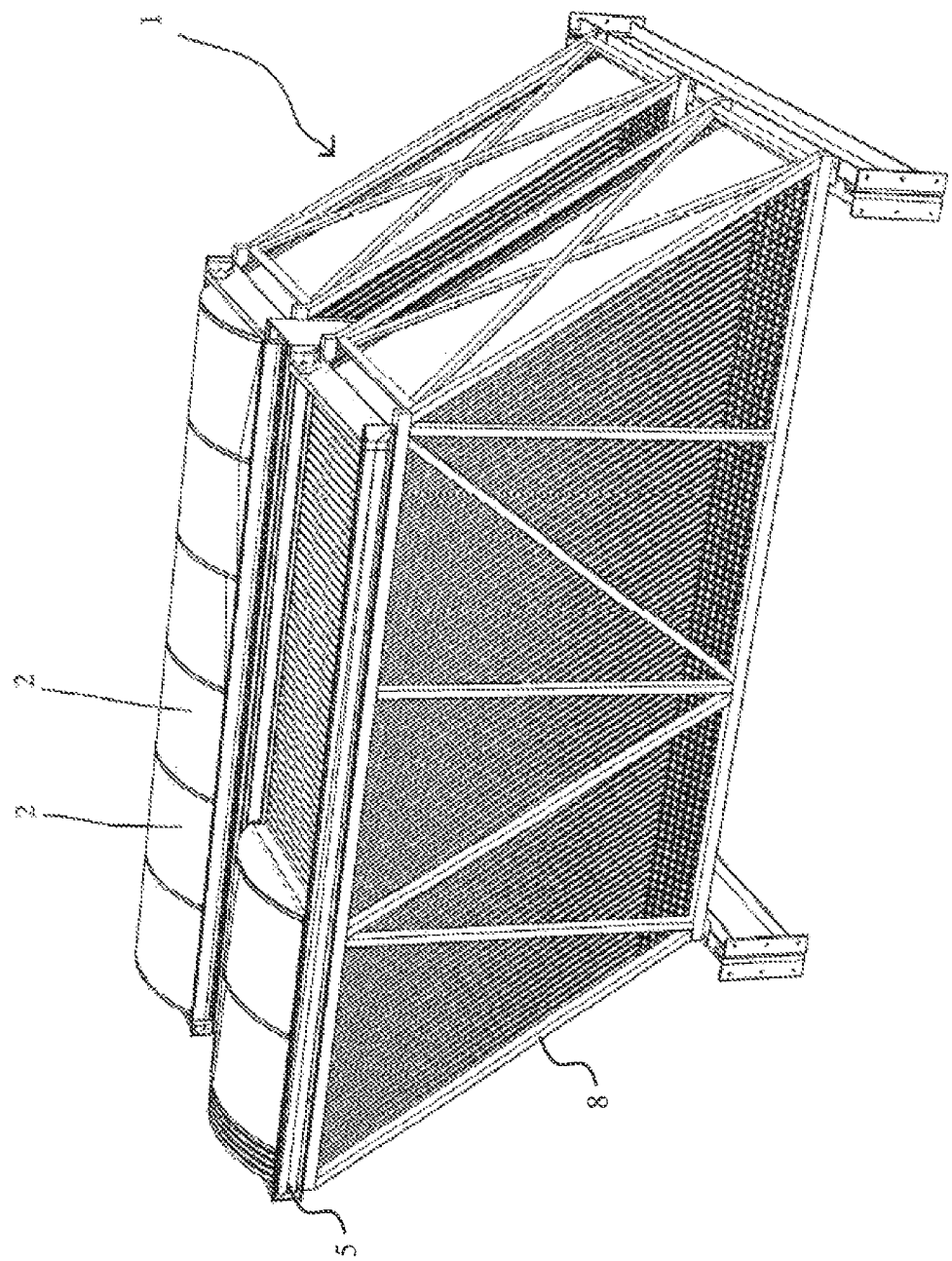
FIG. 8 is an elevated perspective view of one embodiment of the present invention showing a plurality of domed individual plate covers.

FIG. 8 shows a plate settler system 1 utilizing another embodiment of the plate settler covers 2 of the present invention. As shown, the covers 2 may be semicylindrical in shape. However, one having skill in the art will recognize that a plurality of shapes may be utilized, including rectangular, triangular, cubical, etc. Further, the covers 2 may segmented along their width and be made of a material which is compressible, such that the segments of the cover 2 can collapse down into a storage area. Alternatively, the compressibility of the covers 2 may be achieved by utilizing segmented covers 2. The segments would then be allowed to fold in on themselves, reducing their size and allowing them to be stored. Alternatively, the segments could be attached in a telescopic manner, such that each segment slides underneath the next until the segments are in a stored position having the width of one segment.

Figure 9:
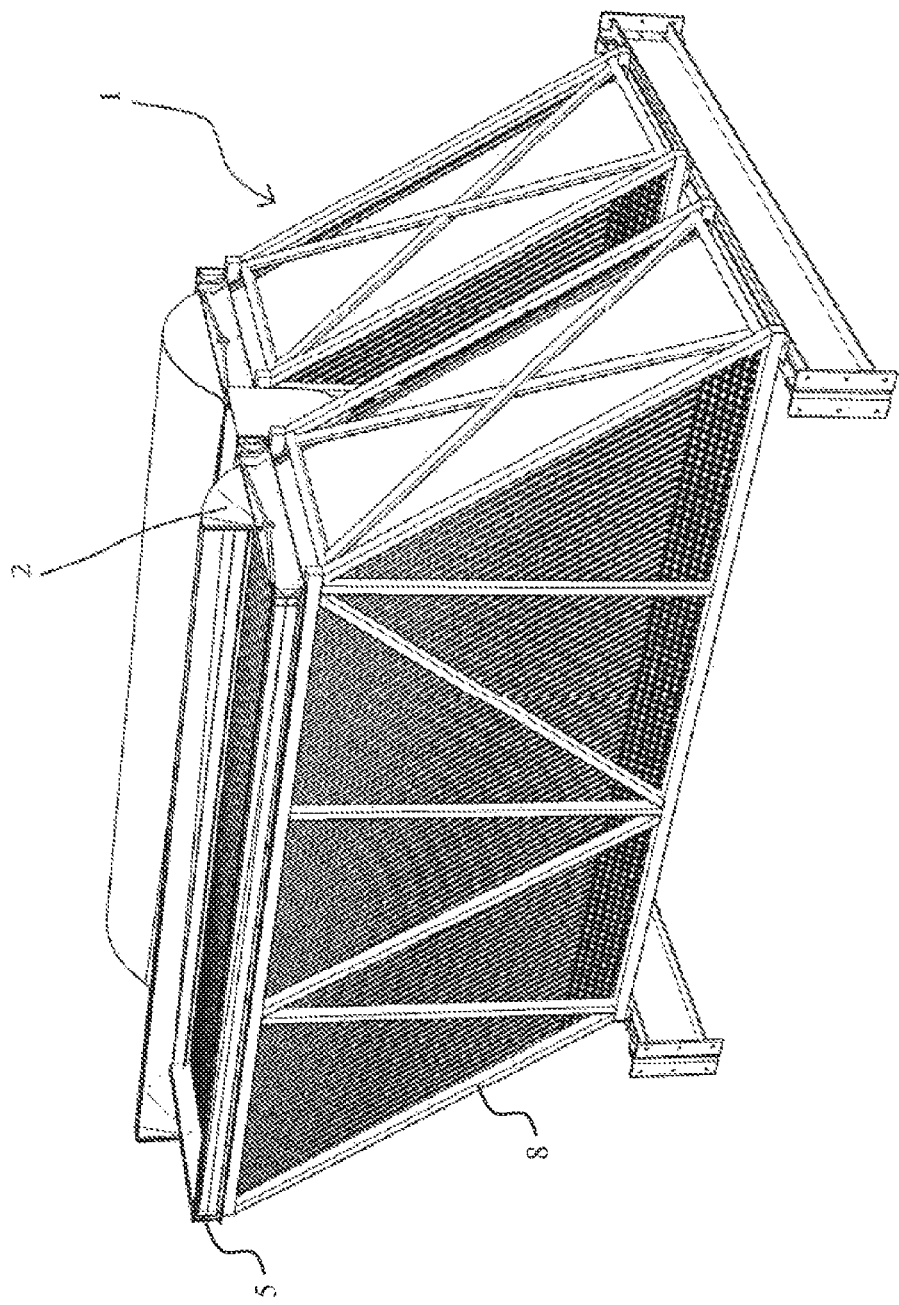
FIG. 9 is an elevated perspective view of one embodiment of the present invention showing a retractable domed plate cover.

FIG. 9 shows a plate settler system 1 utilizing another embodiment of the plate settler covers 2 of the present invention. As shown, the covers 2 may be semicylindrical in shape. However, one having skill in the art will recognize that a plurality of shapes may be utilized, including rectangular, triangular, cubical, etc. Further, the covers 2 may be segmented radially, such that the segments of the cover 2 can rotate into a storage area located on a longitudinal edge of the plate settler system 1. The segments may also be made of a compressible material, such that the segments are able to fold in on themselves, reducing their size and allowing them to be stored. Alternatively, the segments could be attached in a telescopic manner, such that each segment slides underneath the next until the segments are in a stored position.

The foregoing discussion of the invention has been presented for purposes of illustration and description. Further, the description is not intended to limit the invention to the form disclosed herein. Consequently, variation and modification commensurate with the above teachings, within the skill and knowledge of the relevant art, are within the scope of the present invention. The embodiment described hereinabove is further intended to explain the best mode presently known of practicing the invention and to enable others skilled in the art to utilize the invention as such, or in other embodiments, and with the various modifications required by their particular application or uses of the invention.

The invention claimed is:

1. A plate settler system, comprising:
    a plurality of plate settlers positioned in a frame, wherein upper ends of the plate settlers are disposed below some depth of liquid;
    a trough exterior to the frame and adjacent to sides of the plurality of plate settlers; and
    a cover including at least two sections, each section of the cover being segmented and separately removable, each section of the cover at least partially covering one or more of an upper end of a plate settler of the plurality of plate settlers and the trough, the cover adapted to prevent a contaminant from comingling with the liquid, the contaminant comprising at least one of trash, bird feces, leaves, and organic matter.

2. The plate settler system of claim 1, wherein the cover is adapted to substantially block sunlight from reaching a surface of the liquid.

3. The plate settler system of claim 1, wherein the cover is insulated to prevent freezing of the liquid.

4. The plate settler system of claim 1, wherein the cover is adapted to float on the liquid, and wherein the cover comprises at least one of cell foam, an air-entrapped plastic structure, and an inflatable structure.

5. The plate settler system of claim 1, wherein the cover is adapted to distribute and support a weight of at least about 120 pounds, whereby a human operator may walk on a top surface of the cover.

6. The plate settler system of claim 5, wherein the cover comprises a stability aid to improve the stability of the operator when standing or walking on the cover, the stability aid comprising at least one of divots and mounds.

7. The plate settler system of claim 1, wherein the cover is interconnected to the plate settler system by a fastener.

8. The plate settler system of claim 1, wherein the cover comprises a fabric material.

9. The plate settler system of claim 1, wherein the cover comprises a stainless steel.

10. The plate settler system of claim 1, wherein each section of the cover comprises:
a top surface, a first end, a second end opposite to the first end, and two opposing sides that extend from the first end to the second end, wherein the cover is configured to substantially block sunlight from reaching a surface of the liquid.

11. The plate settler system of claim 10, wherein one or more sections of the at least two sections of the cover has a first width sufficient to at least partially cover one or more of an upper end of a plate settler of the plurality of plate settlers and the trough.

12. The plate settler system of claim 11, wherein the first width of the one or more sections of the cover is at least equal to a second width of the plate settler.

13. The plate settler system of claim 12, wherein the cover comprises a fabric material.

14. The plate settler system of claim 12, wherein the cover comprises a mesh material.

15. The plate settler system of claim 12, wherein the cover comprises one or more of an elastic, a polymer, and a vinyl.

16. The plate settler system of claim 11, wherein the top surface of the cover comprises a plurality of divots to improve stability of an operator when standing or walking on the cover.

17. The plate settler system of claim 16, wherein the cover comprises one or more of a polymer, a plastic, and a carbon fiber.

18. The plate settler system of claim 16, wherein the cover is configured to support a weight of at least about 120 pounds to allow the operator to stand or walk on the cover.

19. The plate settler system of claim 16, wherein the cover comprises a stability aid to improve the stability of the operator when standing or walking on the cover, the stability aid comprising at least one of a friction-increasing laminate, a friction-increasing coating, and a friction-increasing film.

20. The plate settler system of claim 5, wherein the cover comprises a stability aid to improve the stability of the operator when standing or walking on the cover, the stability aid comprising at least one of a friction-increasing laminate, a friction-increasing coating, and a friction-increasing film.

* * * * *